United States Patent
Chandrashekar et al.

(10) Patent No.: US 11,156,262 B2
(45) Date of Patent: Oct. 26, 2021

(54) SYSTEM TO PREDICT FAILURES IN SHOCK ABSORBERS

(71) Applicant: Ace Controls Inc., Farmington Hills, MI (US)

(72) Inventors: Rahul Chandrashekar, Farmington, MI (US); Christopher M. Niemiec, Livonia, MI (US); Scott W. McNeil, Ann Arbor, MI (US)

(73) Assignee: ACE Controls Inc., Farmington Hills, MI (US)

( * ) Notice: Subject to any disclaimer, the term of this patent is extended or adjusted under 35 U.S.C. 154(b) by 0 days.

(21) Appl. No.: 16/778,028

(22) Filed: Jan. 31, 2020

(65) Prior Publication Data

US 2020/0248773 A1 Aug. 6, 2020

Related U.S. Application Data

(60) Provisional application No. 62/800,147, filed on Feb. 1, 2019, provisional application No. 62/800,217, filed
(Continued)

(51) Int. Cl.
*F16F 9/32* (2006.01)
*F16F 9/18* (2006.01)
*A63G 31/02* (2006.01)
*G08B 5/22* (2006.01)
*A63G 31/00* (2006.01)

(52) U.S. Cl.
CPC ............ *F16F 9/3264* (2013.01); *A63G 31/02* (2013.01); *F16F 9/18* (2013.01); *F16F 9/3292* (2013.01); *G08B 5/22* (2013.01); *A63G 2031/002* (2013.01); *F16F 2230/0047* (2013.01); *F16F 2230/08* (2013.01); *F16F 2230/24* (2013.01)

(58) Field of Classification Search
CPC ... B64C 25/60; F16F 9/18; F16F 9/061; F16F 9/062; F16F 9/3264; F16F 9/3292; F16F 9/32; G07C 5/006
USPC .......................................... 701/3, 29.4, 31.4
See application file for complete search history.

(56) References Cited

U.S. PATENT DOCUMENTS

| | | | | |
|---|---|---|---|---|
| 3,548,573 A | * | 12/1970 | Krehbiel | F15B 11/072 56/208 |
| 3,581,836 A | * | 6/1971 | Segerdahl | G01G 19/07 177/1 |

(Continued)

OTHER PUBLICATIONS

Ventura, P.J.C. et al., "An embedded system to assess the automotive shock absorber condition under vehicle operation," Sensors, 2008 IEEE, Lecce, Italy, Nov. 2008, pp. 1210-1213, doi: 10.1109/ICSENS.2008.4716660.

(Continued)

*Primary Examiner* — Christopher P Schwartz
(74) *Attorney, Agent, or Firm* — Price Heneveld LLP

(57) ABSTRACT

A shock absorber system may include at least one sensor that is configured to measure an operating parameter of the shock absorber during operation of the shock. The operating parameter may comprise one or more of pressure, temperature, a position of a piston rod of the shock absorber, a velocity of the piston rod, and/or an acceleration of the piston rod. The system may be configured to evaluate measured operating parameter data and to predict a lifespan of the shock absorber and/or detect failure.

22 Claims, 12 Drawing Sheets

Related U.S. Application Data on Feb. 1, 2019, provisional application No. 62/862,760, filed on Jun. 18, 2019.

(56) References Cited

U.S. PATENT DOCUMENTS

| | | | | |
|---|---|---|---|---|
| 4,907,760 | A * | 3/1990 | Sealey | B64C 25/60 |
| | | | | 244/1 OOR |
| 5,094,407 | A * | 3/1992 | Jampy | F16F 9/06 |
| | | | | 244/104 FP |
| 5,707,045 | A | 1/1998 | Easter | |
| 8,275,515 | B2 * | 9/2012 | Wright | G06Q 10/06 |
| | | | | 701/37 |
| 8,335,608 | B2 * | 12/2012 | Mitchell | G08G 1/0104 |
| | | | | 701/31.4 |
| 8,671,099 | B2 | 3/2014 | Kapoor et al. | |
| 9,098,951 | B2 * | 8/2015 | Nieten | G07C 5/00 |
| 9,522,741 | B2 * | 12/2016 | Piroozmandi | B64C 25/34 |
| 10,269,188 | B2 * | 4/2019 | Fazeli | B64F 5/60 |
| 2002/0035423 | A1 | 3/2002 | Shank et al. | |
| 2009/0099719 | A1 * | 4/2009 | Namuduri | G01M 17/04 |
| | | | | 701/29.4 |
| 2009/0287371 | A1 | 11/2009 | Wright et al. | |
| 2014/0238797 | A1 | 8/2014 | Blankenship et al. | |
| 2014/0312171 | A1 | 10/2014 | Schmidt | |
| 2015/0267769 | A1 * | 9/2015 | Fazeli | F16F 9/3292 |
| | | | | 701/3 |
| 2017/0166329 | A1 * | 6/2017 | Fazeli | F16F 9/3264 |
| 2019/0178327 | A1 | 6/2019 | Kunkel | |
| 2020/0011394 | A1 | 1/2020 | Närdemann et al. | |

OTHER PUBLICATIONS

Howard, Carl Q. et al., "Monitoring the Age of Vehicle Shock Absorbers," Research Paper, International Conference on Science and Innovation for Land Power 2018 (ICSILP), Sep. 2018, 5 pages.
Cauley, "Next Generation Shock Absorber Technology and Innovation" Webinar Presentation, ITT Enidine Presentation, Sentinel Adaptable Technologies 4.0 Series, Dec. 12, 2019 (11 pages).

* cited by examiner

SYSTEM TO PREDICT FAILURES IN SHOCK ABSORBERS

CROSS REFERENCE TO RELATED APPLICATIONS

This application claims the benefit under 35 U.S.C. § 119(e) to U.S. Provisional Patent Application No. 62/800,147, and to U.S. Provisional Patent Application No. 62/800,217, both of which were filed on Feb. 1, 2019 and are entitled "MONITORING SYSTEM FOR SHOCK ABSORBERS." This application also claims the benefit under 35 U.S.C. § 119(e) to U.S. Provisional Patent Application No. 62/862,760, filed on Jun. 18, 2019, and which is entitled "SYSTEM TO PREDICT FAILURES IN SHOCK ABSORBERS BASED ON ROD POSITION, PRESSURE AND TEMPERATURE DATA." The entire disclosures of each are incorporated herein by reference.

BACKGROUND OF THE INVENTION

Various energy-absorbing mechanisms (e.g. shock absorbers) for decelerating moving objects have been developed. However, known energy-absorbing mechanisms may suffer from various drawbacks.

SUMMARY OF THE DISCLOSURE

The present disclosure generally relates to a system that is configured to monitor one or more operating parameters of one or more shock absorbers utilizing one or more sensors. The system may be configured to predict and/or detect failure and/or degradation and/or excessive wear of one or more shock absorbers.

One aspect of the present disclosure is a shock absorber having a monitoring/sensing system that detects and/or monitors one or more operating parameters of the shock absorber. The system may be configured to provide an operator with information concerning one or more operating parameters of the shock absorber. The system may also be configured to detect and/or predict malfunctions and/or excessive wear and/or failures of the shock absorber to alert an operator and/or a remote monitoring facility.

A shock absorber and monitoring system according to the present disclosure may be configured for use with virtually any machinery or device that utilizes shock absorbers. Examples include steel mills, lumber mills, shipping yards, warehouses, stacker cranes, automated storage and retrieval systems, etc. According to another example, the system may optionally be configured for use in connection with a device such as a drop tower ride having a shock that slows a moving component, such as a gondola. The shock absorber may optionally include a body and a force-receiving member that is movably connected to the body whereby movement of the force-receiving member relative to the body changes a pressure of an operating fluid (e.g. oil) of the shock absorber. The body may optionally comprise a cylinder having a first cavity or chamber, and the force-receiving member may optionally comprise a piston rod. The shock absorber may optionally include an external accumulator having a second cavity or chamber that receives operating fluid from the cylinder as the piston rod moves when force is applied to the piston rod. The monitoring system may optionally include at least one sensor that is configured to measure an operating parameter of the shock absorber. The operating parameter may comprise one or more of pressure, temperature, a position of the piston rod, a velocity of the piston rod, or an acceleration of the piston rod. In particular, the sensor may be configured to measure the pressure and/or temperature of the operating fluid in the first and/or second cavities and/or a fluid passageway interconnecting the first and second cavities. The sensor, or another sensor, may comprise one or more proximity switches that generate signals when the piston rod is fully extended and/or fully retracted. This data may be utilized to determine the number of cycles the shock absorber has gone through since it was installed. Each sensor may comprise a unique sensor having a serial number or other suitable unique identifier such that the measured and stored data can be associated with a specific (unique) sensor and shock absorber. The data may also have a time stamp or other indicator whereby the measurement time associated with each data point can be stored. It will, however, be understood that the present invention is not limited to drop tower rides or other amusement rides.

The monitoring system is configured to utilize at least one suitable processing/computing device that is operably coupled to the one or more sensors to receive operating parameter data from the sensor. At least one notification device is configured to be operably coupled to the at least one computing device. The computing device is configured to evaluate the operating parameter data according to pre-defined criteria, and to cause the notification device to indicate at least one of 1) a failure of the shock absorber; 2) a malfunction of the shock absorber; or 3) a predicted failure of the shock absorber. The monitoring system may be configured to receive and evaluate data from a plurality of shock absorbers that may be located at various geographic locations.

The system may be configured to predict the end-of-life of shock absorbers and/or detect premature failure and/or excessive wear based on deterioration of characteristics which can be profiled using wear and/or failure signatures read by sensors that are operably connected to the shock absorbers. The system may be configured to utilize sensor data collected either inside or outside of each shock absorber. Each sensor may optionally comprise a wireless sensor. Each sensor may optionally have a unique digital asset number (identification number or code) which may be to a specific shock absorber. Each sensor may optionally perform live monitoring of the characteristics of the shock absorber by collecting data for piston-rod position (e.g. Rod OUT and/or Rod IN), pressure, temperature, vibration and/or other operating parameters. The signals (data) may optionally be communicated to one or more ground control units utilizing a suitable communication protocol such as Wi-Fi, Bluetooth, MATT, LORA, NuBit, Ethernet, Paho, etc. The system may optionally include one or more additional sensors that are configured to monitor various other operating parameters such as vibration, sound, viscosity, etc.

The system may, optionally, be configured to provide information regarding the number of cycles each shock absorber has experienced since it was installed (or other selected time) based on information calculated from the piston rod extension state and/or pressure during each cycle/impact on the shock absorber. As discussed in more detail below in connection with FIGS. 7A-7D, the system may be configured to utilize data from one or more proximity switch(s) and/or a pressure signal (e.g. pressure data) to calculate the time-through-stroke for each cycle. The system may, optionally, be configured to compute the end-of-life of a shock absorber based, at least in part, on one or more of: 1) the number of cycles; 2) the time-through-stroke; 3) the characteristics of the cycles; and/or 4) an operating temperature of the shock absorber, which may optionally be measured within the shock absorber.

The system may optionally include one or more ground control units or other suitable arrangement having one or more computing devices that are configured to process signals (data) from each unique sensor. This processing may involve continuously or periodically updating various calculations over a period of time, or additional sensor data becomes available. The processing may optionally utilize edge computing or other suitable arrangement. The system may optionally be configured to compare the most recent measured values (measured data) with historical data (previously measured data). The system may optionally be configured to utilize algorithms that condition the values (measured data) and profile (i.e. determine) the type of failure or excessive wear that has occurred or is predicted to occur based on the collected sensor readings (measured data). Based on the failure profile that is detected or predicted to occur, a notification may be sent to operators at a ground control unit and/or a central facility to provide an alert with respect to any actions that may need to be performed. The ground control unit may optionally provide a live relay of the performance characteristics of one or more selected shock absorbers to provide a dashboard view to the operators at the ground control unit(s). The system may also be configured to provide information concerning battery status (e.g. charge level) of a battery within the one or more sensors and/or to notify the operators when the battery is due for replacement.

The system may optionally be configured to provide performance values for calibration by engineers or other personnel so that the platform algorithms can be reused and/or modified to provide for specific failure detection. For example, the pressure value for a system warning could be adjusted to a specific application. This adjustment could be based, at least in part, on historical failure data for the same or similar applications. The system may be configured to provide platform (software) updates to ground station software utilizing Flash Over the Air (FOTA) protocol. The collected datasets from each digital asset may be uploaded to the cloud/server space, and users may utilize the stored data to compare the characteristic values of the shock absorber from the day of origination.

The computing device may be configured (e.g. programmed) to detect and/or to predict failures based, at least in part, on deterioration of measured parameters such as pressure and/or temperature. The sensor may have a unique identifier (e.g. serial number), and the computing device may be configured to store data for a particular sensor and shock absorber over time. The system may comprise a plurality of sensors associated with a specific shock absorber, and a plurality of shock absorbers at different geographic locations may be configured to communicate with one or more monitoring/evaluation facilities. The computing device (or devices) may be configured to perform real-time ("live") monitoring of the operating characteristics of one or more shock absorbers by collecting operating parameter data such as pressure, temperature, and acceleration of the piston rod. This data may be wirelessly communicated to a gateway module, and then to a ground controlling edge or cloud unit using wireless communication protocols such as Wi-Fi, Bluetooth, MATT, LORA, NuBit, Ethernet, Paho, etc. Additional sensors may be utilized to monitor various characteristics of the shock absorbers such as vibration (acceleration), viscosity of the working fluid, noise (sound), infrared light, etc. and data from the additional sensors may also be utilized to detect and/or predict shock failure by comparing measured to predefined failure criteria and/or failure prediction criteria.

The facility may include a control station such as a ground control unit, and the computing device may comprise part of the ground control unit. The ground control unit may process signals from each unique digital asset (sensor) over a period of time (e.g. by use of edge computing), and the computed values may be compared to a predefined expected value or range of values. The computing device of the ground control unit (or a central monitoring/evaluation facility) may be configured to condition the computed values and profile a failure type based on the collected sensor readings. Depending on the failure profile, a notification can be sent to an operator of the ground control unit (e.g. to a notification node at the ground control unit) and/or to external devices or locations. For example, the notification may be sent to both a notification device/node of a ground station of the ride or other machinery or devices, and to a remote facility that monitors and/or evaluates the operation of the ride. The computing device of the ground control unit may also be operably connected to remote stations or devices, and can perform a live relay of the characteristics of one or more selected shock absorbers to a dashboard view (e.g. display screen) for monitoring by one or more remote operators. The data sets that are collected from each digital asset (e.g. sensor) may be configured in a cloud/service base, and users can compare characteristics of each shock absorber to other shock absorbers and/or the characteristics of each shock absorber over time.

The system may, optionally, be configured to immediately detect faults or failures, and to communicate the faults and/or failures to an operator of a ride or other machinery or devices. The system may optionally be configured to immediately notify a smartphone, smartwatch, etc. utilizing emails, phone messages (SMS), etc. The system may also optionally be configured to predict failures before the failures occur by evaluating the data from the sensor (or sensors) of one or more shock absorbers (e.g. by use of an algorithm). The history of the operating parameters (sensor data) can be utilized to detect deterioration of the one or more shock absorbers (e.g. using one or more algorithms). If the software of the computing device or devices of the ground control unit and/or other components of the system need to be updated, the software updates may be flashed from the cloud using Flash Over the Air (FOTA) protocol.

The system may be configured to predict failures before they occur utilizing pattern recognition algorithms designed to work with the sensor signals. The system may be configured to provide information concerning battery status within the sensor and to notify the operators whenever the battery is due for replacement.

The system may, optionally, include an edge computing processor that may be configured to utilize preloaded characteristic curves that are utilized as failure signatures. The edge computer may be configured to utilize raw data from the sensors to compare the peak signals and perform pattern analysis of the raw data utilizing characteristic curves to identify patterns & predict failure. The system may be configured to provide a counter which measures the cycles of activation of the shock absorber based, at least in part, on internal pressure data. The system may be configured to use data from two proximity switches (Rod OUT and Rod IN) to calculate time-through-stroke. The system may be configured to combine/utilize data from a proximity switch and a pressure signal to calculate time-through-stroke utilizing one or more of the approaches discussed in more detail below in connection with FIGS. 6A-6D. The system may be configured to predict end-of-life of a shock absorber based, at least in part, on the number of cycles and/or one or more operating conditions. The system may be configured to use the time-through-stroke parameter to detect shock absorber state of health, which will be used in an end-of-life prediction model. The Smart Solution may be configured to record the history of some or all operating parameters which may be utilized to detect and/or predict shock absorber deterioration using algorithms.

The system may be configured to predict normal shock absorber end-of-life to allow for optimal preventative maintenance in manufacturing environments to maximize uptime and minimize costs. The system may also be configured to predict earlier than normal failures and allow for preemptive measures to avoid damage to equipment. The system may also be configured to directly measure time-through-stroke using two proximity switches (e.g. one for Rod OUT and one for Rod IN). The system may also be configured to combine a rod proximity switch status with measured pressure data to calculate (determine) the time-through-stroke. The system may also be configured to calculate the time-through-stroke with only the pressure signal. The time-through-stroke may be used to predict the shock absorber end-of-life. The system may be configured to detect failures that occur and to communicate them immediately so they can be addressed to prevent further damage.

The system of the present disclosure may be utilized in connection with virtually any type of machinery or equipment that utilizes one or more shock absorbers to decelerate one or more moving objects.

These and other features, advantages, and objects of the present disclosure will be further understood and appreciated by those skilled in the art by reference to the following specification, claims, and appended drawings.

DETAILED DESCRIPTION

Figure 2:
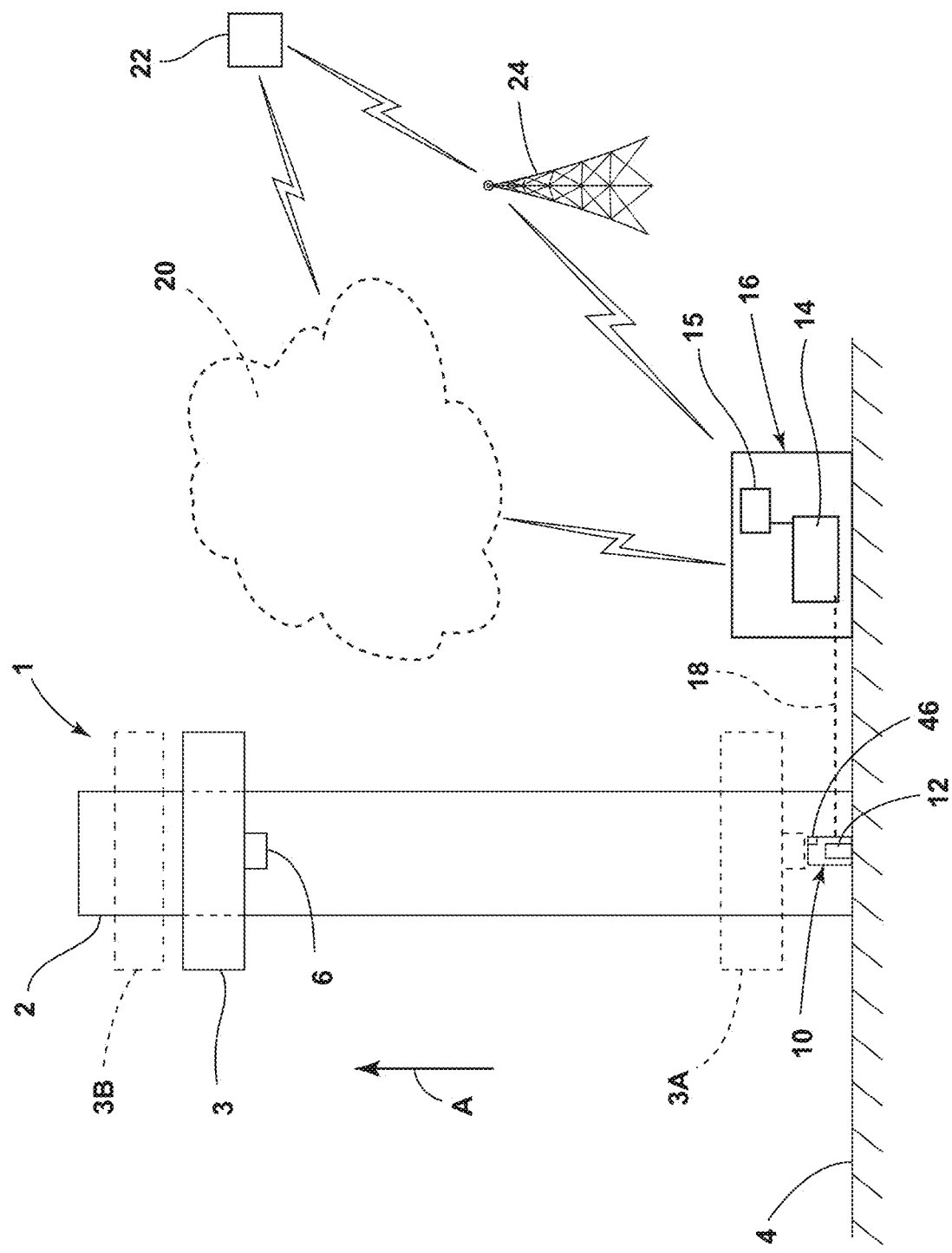
FIG. 2 is a schematic view of a drop ride including a shock absorber and monitoring system according to one aspect of the present disclosure.

For purposes of description herein, the terms "upper," "lower," "right," "left," "rear," "front," "vertical," "horizontal," and derivatives thereof shall relate to the disclosure as oriented in FIG. 2. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure generally relates to industrial shock absorbers that may be utilized to decelerate a moving object. Industrial shock absorbers may utilized in a wide variety of applications such as in steel mills, lumber mills, shipping yards, warehouses, stacker spaces, automated storage and retrieval systems, production machinery, etc. For example, with reference to FIG. 1, a production system 110 or other industrial system may include machinery 112 including one or more moving components 118A, 118B, etc. that are decelerated by one or more shocks 120A, 120B, etc. In the illustrated example of FIG. 1, the machinery 112 converts raw materials 114 into finished products 116. However, it will be understood that the present disclosure is not limited to any specific type of machinery or application. Shocks 120A and 120B may be substantially similar to the shock absorber 10 and associated monitoring system described in more detail below. In particular, shocks 120A and 120B may include sensors that are utilized to predict end-of-life and/or to detect failure and/or excessive wear. Shocks 120A and 120B may also be operably connected to one or more remote devices or stations 16 that may be utilized to monitor shocks 120A and 120B. As also discussed in more detail below in connection with FIG. 2, station 16 may comprise one or more computing devices 14 that are operably connected to one or more sensors 12 of shocks 120A and/or 120B. Sensors 12 and computing device 14 may communicate via wireless signals 18 or other suitable means (e.g. hard lines/wires, etc.). Station 16 may also be configured to communicate with one or more smart phones or other remote devices 22 via network/cloud 20 and/or cellular system 24.

Another application of such shock absorbers relates to amusement park rides of the type that include moving components that must be decelerated. An example of an amusement park ride of this type is generally known as a drop tower. Drop tower rides typically include a gondola that is lifted to the top of a large tower. The gondola is then released to free-fall down the tower. Various types of brakes and other energy-absorbing devices have been developed to slow the gondola as it approaches the bottom of the ride.

With reference to FIG. 2, a device 1 may comprise a movable member 3 that engages a shock absorber 3 to decelerate movable member 3 as the movable member 3 approaches an end of travel position 3A. Device 1 may comprise a guide structure such as a tower 2, and movable member 3 may comprise a gondola 3. In use, a powered mechanism of a known type (not shown) raises the movable member 3 from a lower or ground position 3A to a raised position 3B in the direction of the arrow "A." The movable member 3 is then released, and the movable member 3 travels downwardly to the lower position 3A. Device 1 may comprise virtually any type of a device that includes a shock absorber 10 that is configured to decelerate a moving member.

As the movable member 3 approaches the lower position 3A, a shock-engaging structure 6 of the movable member 3 engages a shock absorber 10 located near the ground 4 to thereby decelerate the movable member 3. The shock absorber 10 may be secured to the tower structure 2. Alternatively, shock absorber 10 could be mounted to a moving component (e.g. movable member 3), and the present disclosure is not limited to any specific arrangement or configuration.

The device 1 may include a ground station 16 having one or more computing devices 14 that are operably connected to one or more sensors 12 of shock absorber 10. The sensor 12 and computing device 14 may include wireless transmitters and/or receivers to thereby communicate via a wireless signal 18. The wireless signal 18 may comprise a Wi-Fi signal, a Bluetooth signal, or the like. It will be understood that the sensor 12 may be connected to the computing device 14 utilizing a conventional conductive line or the like. Computing device 14 may also be configured to communicate with one or more remote devices 22 via a network or cloud 20 and/or cell towers 24 or other suitable communication devices. The remote device 22 may comprise a smartphone, computer or the like. For example, the remote device 22 may comprise a smartphone that is utilized by remote personnel to monitor the operation of the shock absorber 10 and/or device 1. Remote device 22 may also comprise a computing device at a monitoring facility. For example, one or more remote devices 22 may be utilized at a centralized location to monitor a plurality of shock absorbers 10 at a plurality of devices 1. In this way, a centralized monitoring facility may be utilized to simultaneously monitor numerous devices 1 at one or more geographic locations. It will be understood that computing device 14 of ground station 16 may be physically located outside of, or remote from the physical structure of ground station 16. Also, computing device 14 may comprise a plurality of computing devices that are interconnected. Thus, as used herein, the term "computing device" may comprise virtually any number of devices in any configuration that perform evaluation and/or monitoring.

Figure 3:
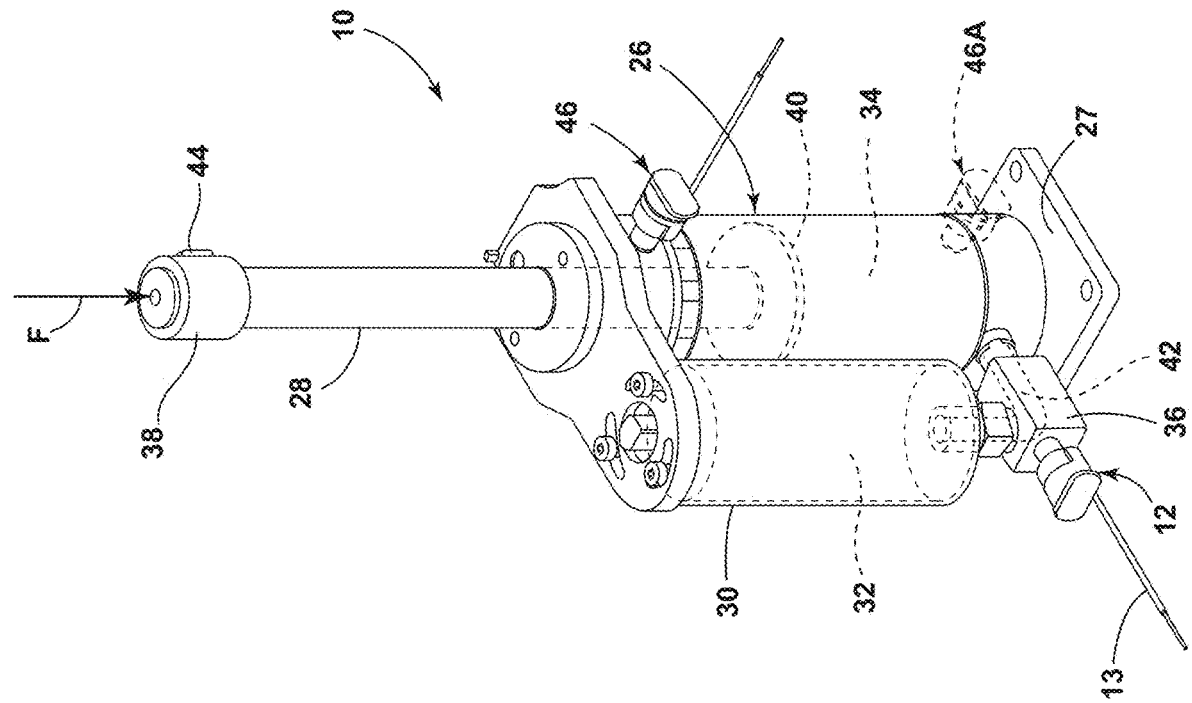
FIG. 3 is an isometric view of a shock absorber and sensor according to another aspect of the present disclosure.

With further reference to FIG. 3, shock absorber 10 includes a body in the form of a cylinder 26 and a force-receiving member such as piston rod 28. Shock absorber 10 may include an external accumulator 30 having an internal chamber 32 that is fluidly connected to a main chamber 34 of cylinder 26 via a fluid passageway including fitting 36. Sensor 12 may be connected to fitting 36 such that the sensor 12 measures the pressure and/or temperature of working fluid (e.g. oil) passing through fitting 36. Thus, the sensor 12 may be configured to measure the pressure and/or temperature of fluid in chamber 32 of external accumulator 30. However, sensor 12 may be configured to measure pressure and/or temperature of working fluid in chamber 34 of cylinder 26. It will be understood that the system may include a plurality of sensors to measure one or more of pressure and/or temperature of working fluid in chambers 32 and/or 34 and/or metering passageway 42 and/or any other suitable location. The shock absorber 10 may include a bracket 27 or other suitable mounting structure to provide for mounting of the shock absorber 10 to a tower structure 2 or the like. Sensor 12 preferably includes an antenna 13 to provide wireless communication with one or more devices such as computing device 14 of ground station 16 (FIG. 2).

In use, if a force "F" is applied to outer end 38 of piston rod 28, the piston rod 28 moves linearly, and piston 40 (inner end) of piston rod 28 causes an increase in the pressure of working fluid in the main chamber 34 of cylinder 26. A metering passageway 42 and fitting 36 fluidly interconnect the main chamber 34 and the internal chamber 32 of external accumulator 30. The metering passageway 42 controls the flow of the working fluid from main chamber 34 to internal chamber 32 of external accumulator 30 in a manner that is generally known in the art. It will be understood that metering passageway 42 is shown schematically. The metering passageway may include an inner tube (not shown) disposed inside cylinder 26 (outer tube) and the inner tube may include orifices (not shown). Various orifice (metering) configurations are known, and the present disclosure is not limited to any specific orifice/metering configuration.

The sensor 12 is preferably positioned in a fluid communication with internal chamber 34 of external accumulator 30 to thereby measure one or more operating parameters of shock absorber 10. The operating parameter may comprise at least one of pressure and temperature of the working fluid in external accumulator 30. However, as discussed above, it will be understood that the sensor 12 could alternatively be configured to measure the pressure and/or temperature of the working fluid in the metering passageway 42 or the main chamber 34.

A wireless sensor 44 may optionally be utilized to measure an operating parameter of shock absorber 10 such as an acceleration of piston rod 28. Sensor 44 may comprise a self-charging sensor including a battery that is charged upon movement of sensor 44. A sensor 46 may optionally be utilized to detect an operating parameter of shock absorber 10. Sensor 46 may comprise a wireless proximity switch or sensor that may be configured to detect the presence of rod end 40 inside cylinder 26 when piston rod 28 is in a fully extended position to thereby generate a "Rod OUT" signal. When configured in this way, proximity sensor 46 provides a switch function (limit switch). One or more sensors 46A (e.g. proximity switches) may also be utilized to detect an operating parameter of shock absorber 10. Sensor(s) 46A may comprise proximity switches that detect when piston rod 28 is in a fully retracted (compressed) position. Thus, the system may be configured to detect operating parameters including fully extended ("Rod OUT") and/or fully retracted/compressed ("Rod IN") positions of piston rod 28. Proximity switch or sensor 46 may be configured to send a wireless signal to computing device 14 when rod end 40 is detected (e.g. when piston rod 28 is fully extended or fully compressed). Proximity sensor 46 may be utilized to determine a number of cycles shock 10 has experienced (e.g. since being installed in a device 1) and/or other operating parameters (e.g. time-through-stroke). Sensor 46A may be utilized to generate a "Rod IN" signal that may also be utilized to determine a number of cycles of shock 10 and/or time-through-stroke. Alternatively, sensor 46 may comprise a position sensor that is configured to detect (measure) a position of piston rod 28 relative to cylinder 26. The position data may be measured continuously or at very small time intervals (e.g. 0.01 seconds, 0.005 seconds, 0.0001 seconds, etc.), and the position and time data may be utilized to determine the velocity of piston rod 28 during each cycle of shock 10 by numerically calculating a derivative of position with respect to time. The acceleration of piston rod 28 may also be determined by taking (calculating) a second derivative of position with respect to time. As discussed in more detail below in connection with FIG. 7, data from sensor 12 and/or sensor 46 may be utilized to determine a predicted life of shock 10 and/or to determine if shock 10 has failed according to predefined failure criteria. Acceleration sensor 44 is not necessarily required if sensor 46 is configured to determine acceleration and/or if a life cycle prediction and/or failure criteria determination do not require acceleration. It will be understood that shock 10 may include both sensors 12 and 46, only sensor 12 or only sensor 46 as required for a particular application. Furthermore, the location, type, and number of sensors 12, 46, etc. may vary as required for a particular application, and the present disclosure is not limited to any specific number of sensors or types of sensors. In general, any sensors capable of providing data relating to operating parameters and/or the number of cycles may be utilized.

Figure 4:
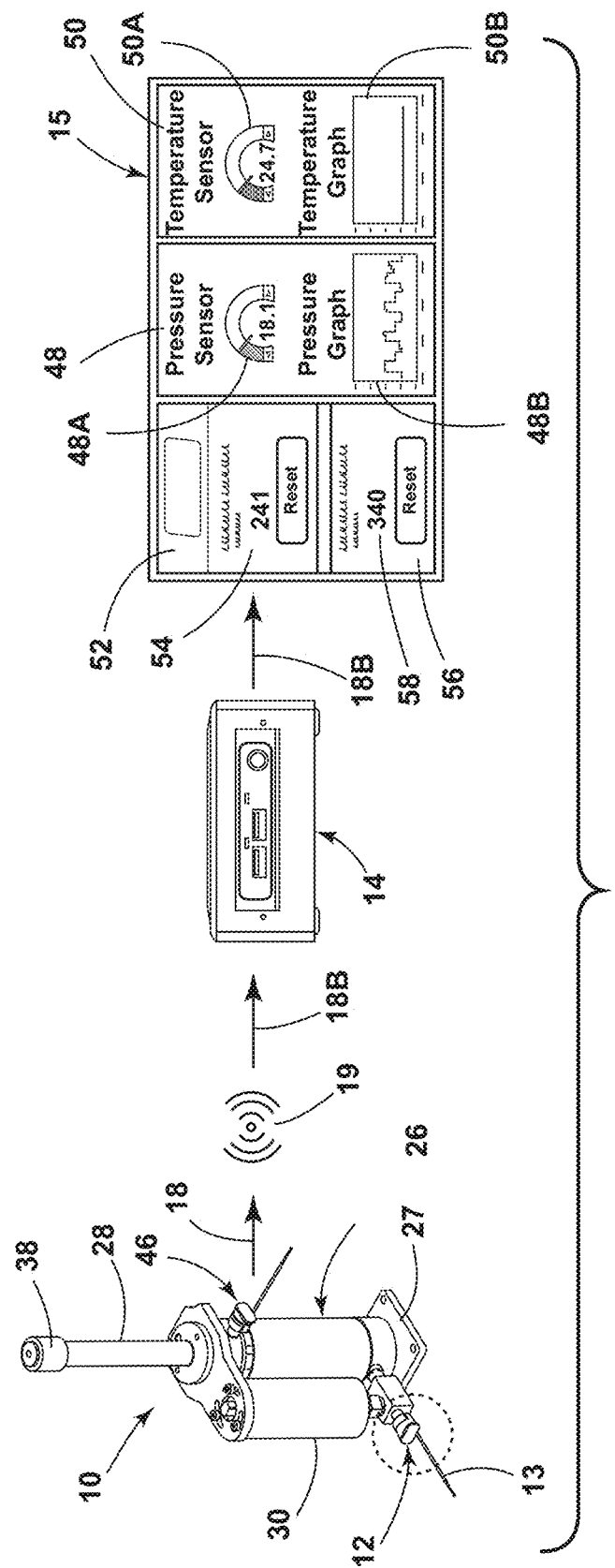
FIG. 4 is a schematic view showing a shock absorber and sensor, computing device, and notification node or device according to another aspect of the present disclosure.

With further reference to FIG. 4, the sensors 12 and 46 of shock absorber 10 are configured to communicate with one or more computing devices 14 utilizing wireless signals 18 and 18A. It will be understood that virtually any communication means (e.g. hard lines) may also be utilized. The wireless signals from sensors 12 and/or 46 may be communicated via a wireless receiver node 19 that is configured to use Wi-Fi, MATT, Bluetooth, LORA, NuBit, eSIM, GSM, Ethernet, Paho or other suitable wireless technology. The wireless receiver node 19 generates wireless signals 18B that are received by the computing device 14. The computing device 14 may comprise virtually any suitable computing device or devices, and may be programmed to process data from sensors 12 and/or 46 of a shock absorber 10. It will be understood that, if required for a particular application, data from only sensor 12 or data from only sensor 46 may be utilized. The computing device 14 may be configured to receive data from a plurality of shock absorbers 10 having sensors 12 and/or 46, and the computing device 14 may be configured to process the data from multiple sensors 12 and/or 46. Each sensor 12 and/or 46 may have a unique identifier (e.g. a Serial No.), and data from each sensor 12 and/or 46 over time may be stored and retrieved for processing and evaluation.

The computing device 14 is preferably configured to generate notifications that may be transmitted wirelessly via a signal 18B to a notification device such as a display screen 15 (FIG. 4) that may optionally be located at ground station 16 (FIG. 2). The notification device may alternatively comprise a smartphone 22 or other device that is located remote from the ground station 16. It will be understood that the system may include a plurality of screens and/or other suitable notification devices disposed at various locations.

With reference to FIG. 4, display 15 may include a first portion 48 that displays pressure data from sensor 12, and a second portion 50 that displays temperature data from sensor 12. The pressure and/or temperature data may be displayed in graphic form and/or numerically, and/or in any other suitable manner. For example, the pressure sensor display may include a real-time display 48A showing current pressure readings, and a chart or graph 48B displaying pressure over time. Similarly, the temperature display may display the current temperature 50A and temperature over time 50B. The pressure and/or temperature displays may be continuously and rapidly updated.

Notification device 15 may include a pressure cycle display 52 that displays the number of pressure peaks 54 that a shock absorber 10 has experienced. Pressure cycle display 52 may be provided utilizing pressure data from pressure sensor 12. It will be understood that the number "241" shown in FIG. 4 is merely an example of a number of cycles that a shock absorber 10 may have experienced in operation, and the number will increase over the life of shock absorber 10. Notification device 15 may also include a rod position cycle counter display 56 that displays the number of cycles 58 measured by proximity sensor 46. As discussed in more detail below in connection with FIG. 6, the system may be configured to detect and/or predict failure of one or more shocks 10 that are operably connected to the system based, at least in part, on data from sensor 12 and/or sensor 46.

Figure 4A:
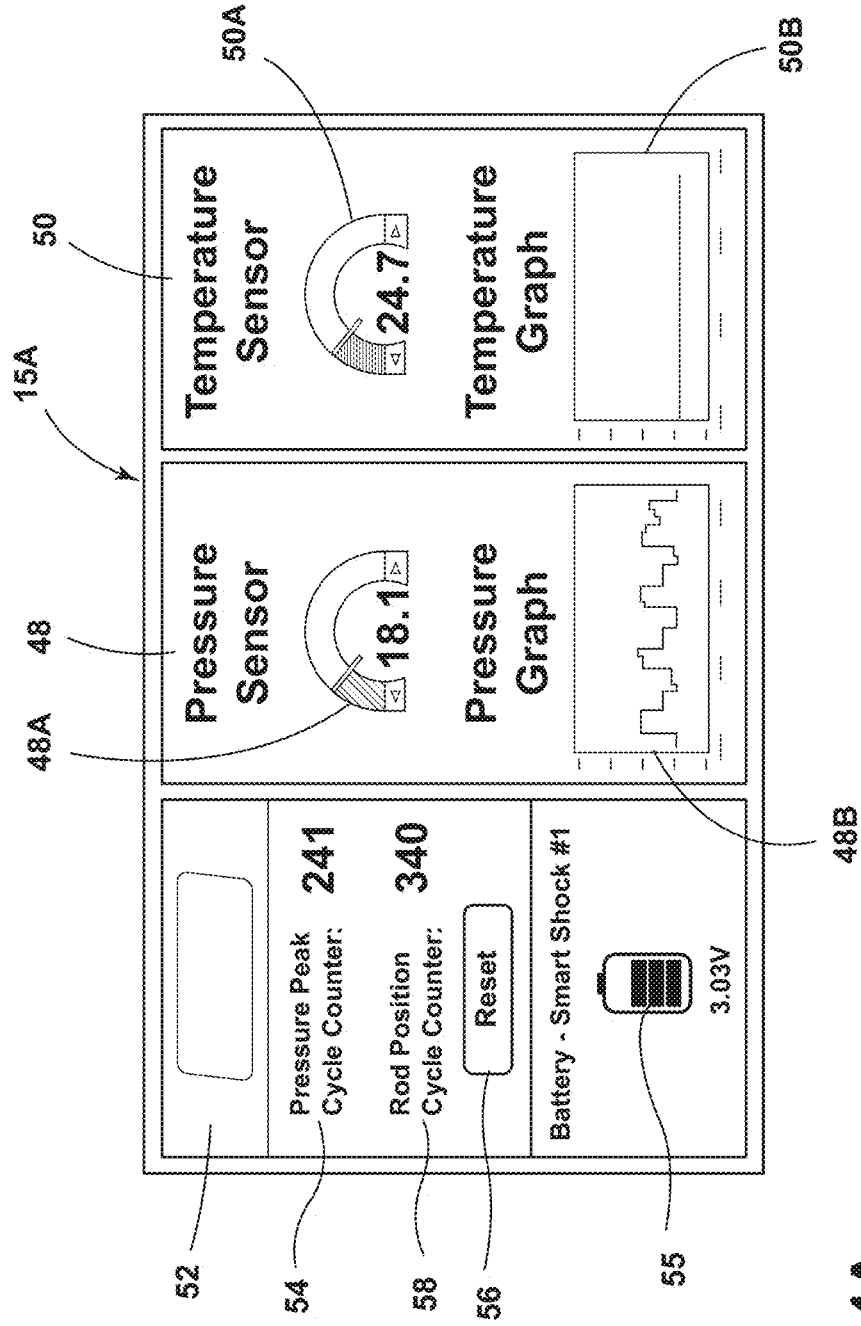
FIG. 4A is a notification display.

With further reference to FIG. 4A, notification device 15A is similar to device 15, and further includes a battery display/notification feature 55. Display feature 55 may comprise battery voltage levels of one or more batteries utilized to provide electrical power to one or more of sensors 12, 44, 46, and/or other electrical devices of the system.

Figure 5:
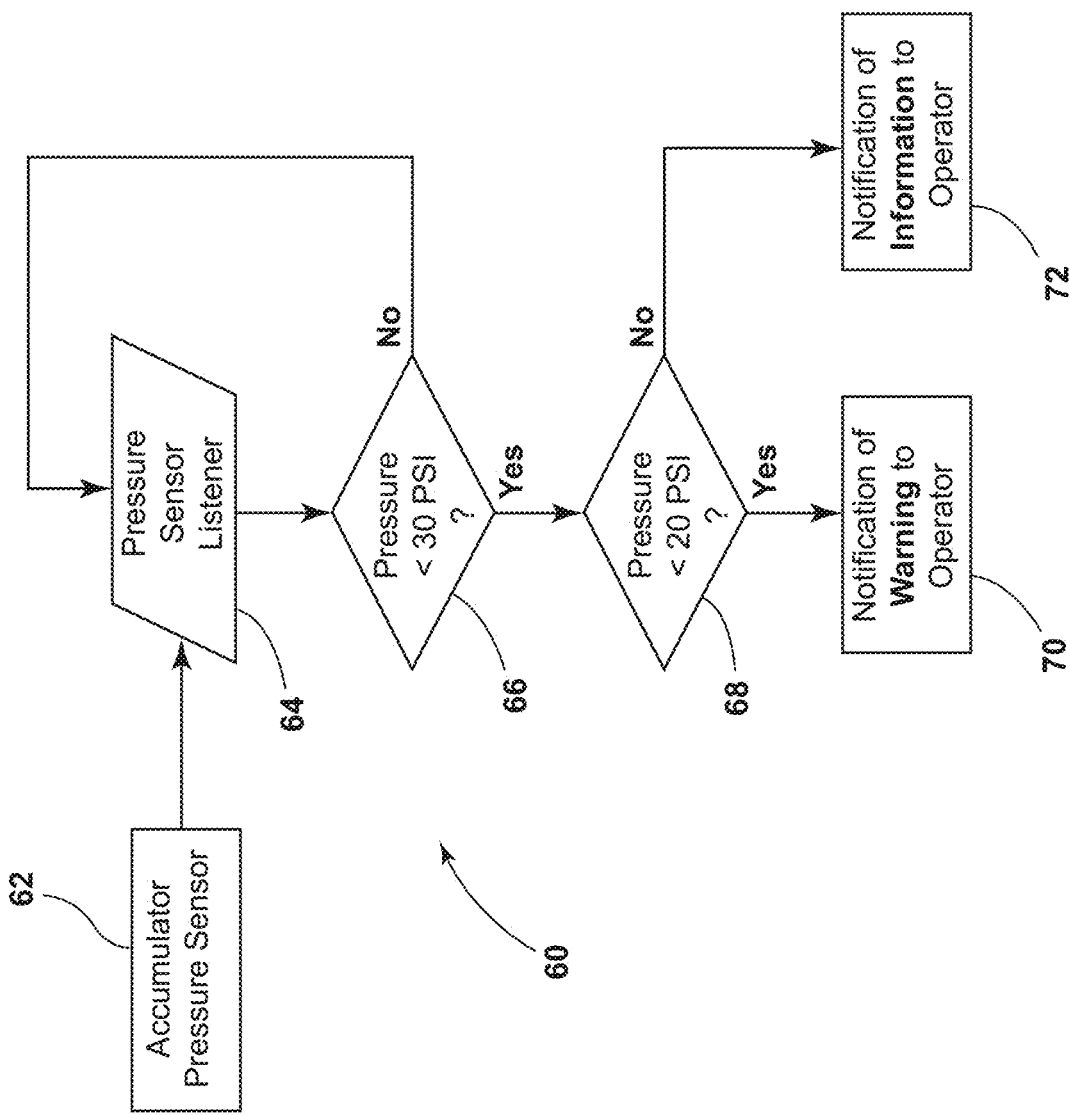
FIG. 5 is a flow chart showing operation of a system according to one aspect of the present disclosure.

A pressure-based monitoring diagnostic process 60 according to one aspect of the present disclosure is shown in FIG. 5. Pressure data from sensor 12 (step 62) may be provided to a computing device 14 (step 64). At step 66, the computing device 14 determines if the measured sensor data meets predefined criteria. In the illustrated example, the sensor data 62 may comprise a pressure measurement, and the criteria applied at step 66 may be a determination if the measured pressure is below a predefined value (e.g. 30 psi). If the pressure is not below 30 psi at step 66, the process returns to step 64, and a subsequent pressure reading is then received and evaluated. If a series of pressure readings are above 30 psi at step 66, the process continues to cycle (loop) between steps 62, 64, and 66. However, if a given pressure data reading is less than 30 psi at step 66, the process continues to step 68, and the computing device 14 determines if the pressure is below 20 psi. If not, the process continues to step 72, and notification information is provided to the operator. For example, the notification device 15 or 15A may generate a "yellow" alert (e.g. "pressure low") indicating that the pressure is above 20 psi, but below 30 psi. In this example, this pressure range represents a pressure (operating parameter) that is potentially not optimum or expected, but also does not meet predefined failure and/or warning criteria.

Figure 1:
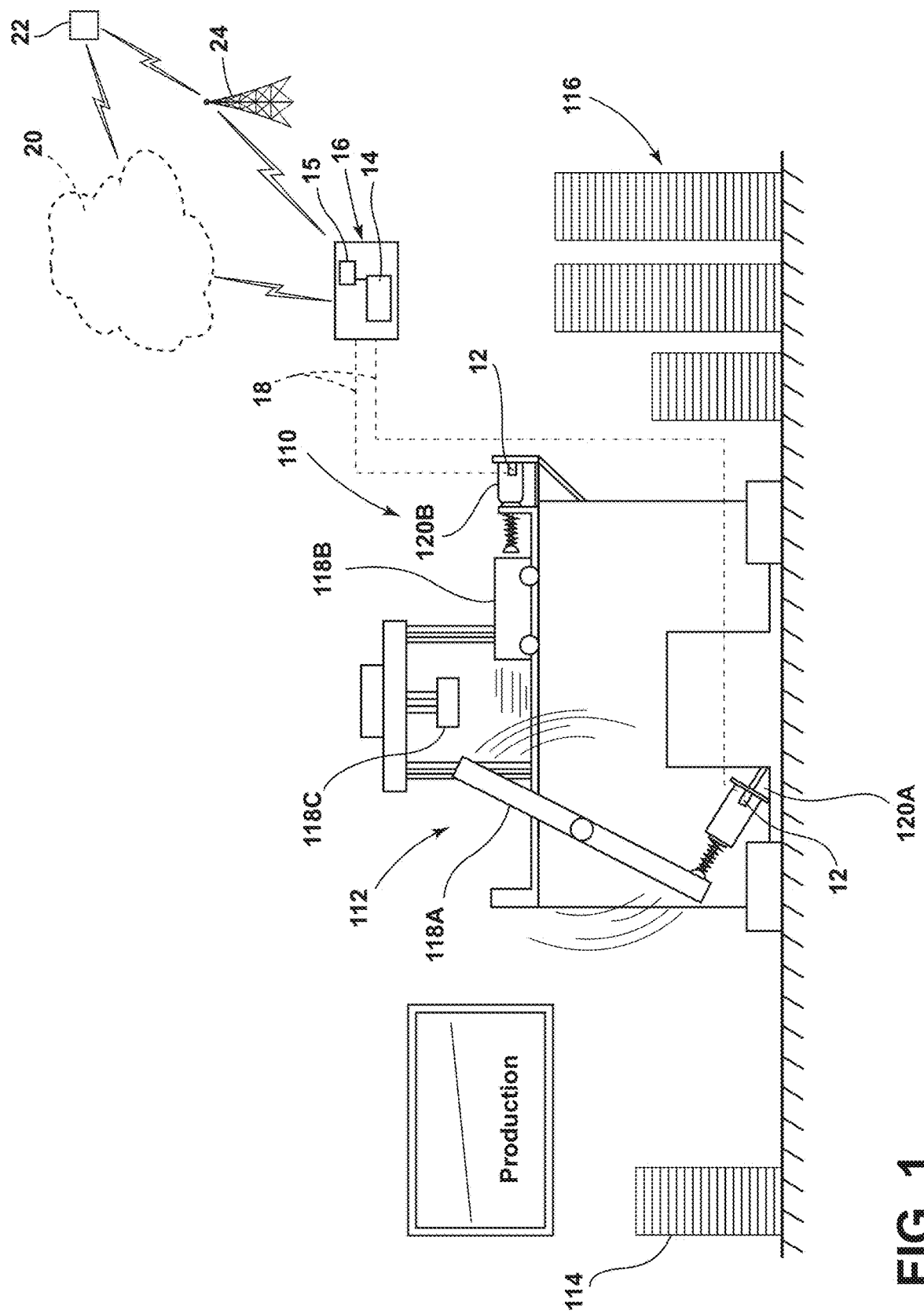
FIG. 1 is a schematic view showing production machinery including one or more shock absorbers according to another aspect of the present disclosure.

If the measured pressure data is below a predefined critical level (e.g. 20 psi) at step 68, the process continues to step 70, and a "red" warning or alert to an operator is generated. For example, the notification device 15 or 15A may provide a warning message alerting the operator of the low pressure, and instructing the operator to stop operation of the device 1 (FIG. 2) or other device (FIG. 1). The system may be configured to automatically shut down or stop operation if the sensor data indicates that the shock absorber 10 has failed and/or reached an unsafe operating condition.

It will be understood that FIG. 5 is merely an example of one possible criteria and process. For example, the computing device 14 may be configured to receive temperature data at step 64, and to evaluate the temperature data at step 66 and 68 to generate alerts and/or warnings if the temperature data indicates that a potential problem exists or if a potential failure or an unsafe operating condition has occurred. It will be understood that the system may be configured to simultaneously evaluate numerous operating parameters utilizing sensor data inputs, including pressure, temperature, rod proximity (rod out/ready-proximity switch) position, velocity, acceleration, vibration, etc. to determine if a potentially problematic operating condition exists and/or if a failure or unacceptable operating condition exists.

Furthermore, the system may be configured to evaluate the data from sensor 12 over time to determine if a trend exists indicating that the shock absorber 10 is no longer functioning properly and/or to predict a future failure of the shock absorber 10. For example, a shock absorber 10 may be subject to testing to gather empirical measurements of pressure, temperature, and/or other operating parameters over time, and this data may be utilized to develop criteria for predicting failure of a shock absorber 10 in use. If testing shows that pressure and/or temperature data typically changes over time (e.g. linear or exponential peak pressure decline as a function of a number of cycles) and if failure is likely to occur once peak pressure reaches or approaches a given value, the measured pressure data can be utilized to predict the remaining number of cycles for the life of the shock.

Also, if one or more shock absorbers 10 are in use in a plurality of devices (e.g. a plurality of devices 1 (FIG. 2) or other machinery) (FIG. 1), historical data for numerous shock absorbers 10 can be gathered, stored, and evaluated to determine criteria for predicting future failure of the shock absorbers 10. The computing device 14 may be configured to generate signals to one or more notification devices 15 (or 15A) to alert an operator and/or a remote facility to a failure and/or to provide an operator with an estimated lifespan (e.g. remaining number of cycles) for one or more shock absorbers 10.

The one or more computing devices 14 may be operably connected to one or more remote devices 22. For example, remote device 22 (FIGS. 1 and 2) may comprise a device or system at a central monitoring station or facility that is operably connected to a plurality of shock absorbers 10 at a plurality of geographic locations. Engineers or other technical specialists at the monitoring center may monitor and evaluate the data received from the shock absorbers 120A, 120B (FIG. 1) and/or shock absorbers 10 (FIG. 2) at one or more remote geographic locations to provide additional monitoring and alerts to operators or other personnel at the individual devices 1 and/or facilities/locations. This data may be utilized to develop additional criteria to predict shock lifespans, acceptable combinations of operating parameters, etc. It will be understood that the devices 110 and 112 (FIG. 1) and the device 1 (FIG. 2) are merely examples of machinery and/or devices that may utilize a failure detection/prediction system and shock absorber 10.

As discussed in more detail below in connection with FIG. 6, the system may utilize a controller that is configured to predict the normal end-of-life of one or more shock absorbers 10 and/or detect premature failure based on the deterioration of the operating parameters (characteristics) of the shock absorber 10. The system may configured to detect and evaluate deterioration of the operating parameters (characteristics), which can be profiled using failure signatures that are read by one or more of the sensors 12, 44, 46, etc. of the shock absorbers 10.

Each sensor 12, 44, 46, etc. (FIG. 3) may optionally have a unique digital identifier (e.g. a serial number) which may be associated with each specific shock absorber 10 to provide for live monitoring of the performance characteristics of each individual shock absorber 10 by collecting data for one or more of pressure, temperature, vibration, and/or other operating parameters. These signals (e.g. data) may be communicated to a ground control station 16 using a suitable wireless protocol such as Wi-Fi, Bluetooth, MATT, LORA, NuBit, Ethernet, Paho, etc., or other suitable arrangement. The system may include one or more sensors (e.g. 12, 44, 46, etc.) that are configured to monitor various operating parameters (characteristics), such as sound, viscosity, pressure, temperature, position of the piston rod, etc.

The system may be configured to provide information regarding the number of cycles that each shock absorber 10 has experienced (e.g. cycle counters 54 and/or 58, FIG. 4). The computing device 14, or other computing device, may be configured to determine information regarding the number of cycles based on information calculated from pressure peaks and/or rod position during each impact on the shock absorber 10. The system may be configured to compute the end-of-life of each shock absorber 10 based on the number of cycles and/or the operating temperature and/or virtually any other measured variable (operating parameter) of each shock absorber 10.

The computing device 14 and/or other computing facilities of the ground station (or remote facility) may optionally be configured to perform edge computing on the signals from each unique digital asset (sensor) over time, and compare the values with a historical dataset stored in the computer device 14 or other device. The system may be configured to utilize an algorithm that conditions the values and profiles the failure type based on the collected sensor readings/data. Based on the failure profile, a notification may be sent to an operator or other facility, and additional actions may then be performed. The ground control station 16 may be configured to provide a live relay of the performance characteristics of one or more shock absorbers 10 in a dashboard view (e.g. notification device 15, FIG. 4) to one or more operators and/or remote personnel.

The system provides a solution wherein the performance values (failure and/or warning criteria) can be calibrated by engineers or other technical personnel so that the algorithms can be modified (if necessary) and used to detect specific failures based on the needs of a specific user. The system may be configured as required for various types of machinery and devices. Also, the system may be configured to predict failure for specific types or sizes of shock absorbers 10. Thus, the system may be modified to provide failure prediction and/or warning for specific types/sizes of shocks 10, and/or the particular application. For example, a specific size and type of shock 10 may be used in a first machine (e.g. 118A, FIG. 1) and an identical shock 10 may also be used in a second machine (e.g. 118B, FIG. 1) having a significantly different configuration. In use, the pressures, temperatures, time-through-stroke, may be significantly different due to differences between the first and second machines. The operating parameter criteria utilized to determine shock failure and/or shock failure prediction may be different for the two different machines. For example, a 25 psi measured pressure could trigger a caution type warning for the first machine, whereas the same 25 psi pressure could trigger a failure warning when in the second machine.

If the software of ground station 16 needs to be updated, the software update can be flashed from the cloud using the Flash Over the Air (FOTA) protocol. The datasets collected from each digital asset (sensor) may be updated to the cloud and/or other surface space and users may then compare the measured values of the operating parameters (characteristics) of the shock absorber(s) 10 to the initial operating parameters measured at the date of origination (e.g. first use).

Figure 6:
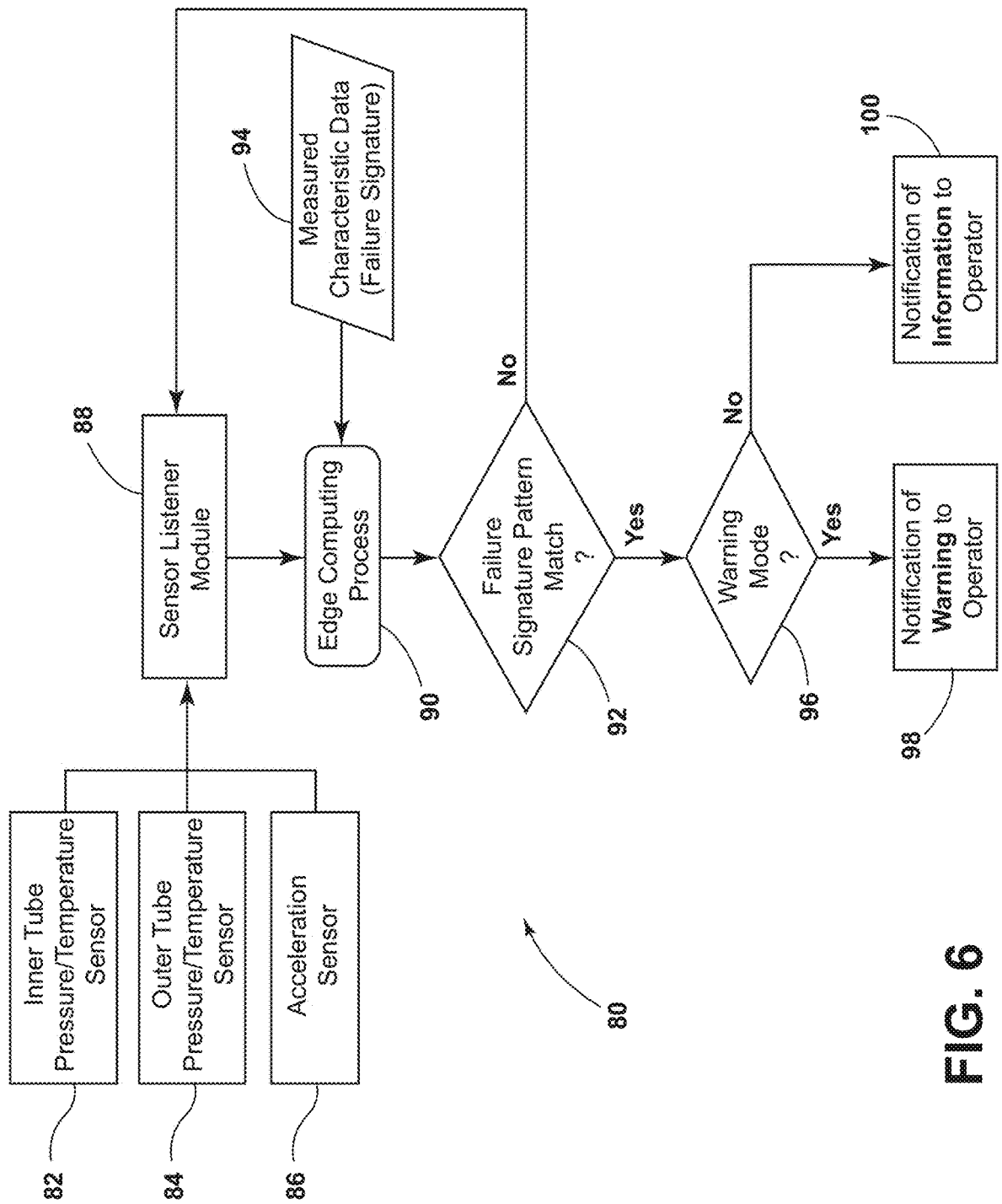
FIG. 6 is a flow chart showing shock absorber failure detection and/or prediction according to one aspect of the present disclosure.

With reference to FIG. 6, a process 80 according to another aspect of the present disclosure utilizes one or more data inputs 82, 84, and/or 86. Input 82 may comprise pressure and/or temperature of fluid in a main tube cylinder 26, and input 84 may comprise pressure and/or temperature of fluid in external tube or accumulator 30 received from a second pressure/temperature sensor (not shown) that is operably connected to accumulator 30. Input 86 may comprise acceleration data from sensor 44, or acceleration data determined utilizing position data from proximity sensor 46 (e.g. by determining a second derivative of position with respect to time).

A sensor or listener module 88 may be configured to receive data from an inner tube pressure/temperature sensor 82, an outer tube pressure/temperature sensor 84 and/or an acceleration sensor 86. Sensors 82, 84, and 86 are merely examples of sensors that may be utilized in accordance with the present disclosure, and the present disclosure is not limited to these specific sensors or variations thereof. The sensor or listener module 88 provides information to a process 90 (e.g. edge computing process) that also receives measured parameter (characteristic) data (e.g. predefined failure criteria or signature 94). The system (e.g. one or more processors that are operably connected to the sensors) then determines if a measured potential failure pattern (e.g. a combination of measured data) from one or more of the sensors matches one or more predefined failure criteria or signatures at step 92. If the measured pattern (data) does not match a predetermined failure criteria or pattern, the process returns to step 88 (the sensor listener module). However, if the system determines that the measured data matches a predetermined failure signature (i.e. meets predefined failure criteria) at step 92, the process continues to step 96. The step 92 criteria may comprise predefined criteria that is satisfied even if only relatively minor (non-critical) operating parameter abnormalities are defined. At step 96, the system determines if a warning mode should be activated. This determination may comprise a determination of the type of failure signature (criteria) pattern patch. For example, the predefined failure signatures may be categorized as either a warning failure mode or an information failure mode, depending on the severity of the failure mode. The failure signature/pattern/criteria may comprise, for example, a specific combination of operating parameter data that has been determined to correspond to a failure of shock 10, or corresponds to a predictable remaining life of shock 10. One or more failure signature/pattern/criteria may be determined empirically.

Referring again to FIG. 6, if the system determines at step 96 that the measured data satisfies predefined warning failure criteria, and that a warning mode is to be implemented, the system provides a warning notification to an operator at step 98. If the system determines at step 96 that the measured data does not satisfy the warning failure criteria, and the warning mode is not to be implemented, the system provides a notification of information to an operator as shown at step 100.

In general, the present disclosure provides a way to immediately detect faults or other operational problems and communicate the faults to operators via smartphone, smartwatch, emails, SMS, etc. The system may include a counter which determines and updates the number of cycles of activation of a shock absorber 10 based on measured data, such as internal pressure data. The system may be configured to predict the shock absorber end-of-life based on the number of cycles, operating conditions (e.g. operating parameters) such as pressure, temperature, and/or other data. The present system provides a way to record (store) the history of the operating parameters. The stored data may be utilized to detect deterioration and/or failure using one or more approaches (e.g. algorithms). The system may be configured to predict failures before they occur utilizing predefined criteria (e.g. algorithms) that are configured to work with signals (data) from the sensors. The system may be configured to predict end-of-life based on pattern recognition (e.g. algorithms) utilizing end-of-life models. The system may be configured to provide for updates of the ground station software from the cloud utilizing FOTA protocol.

Figure 7:
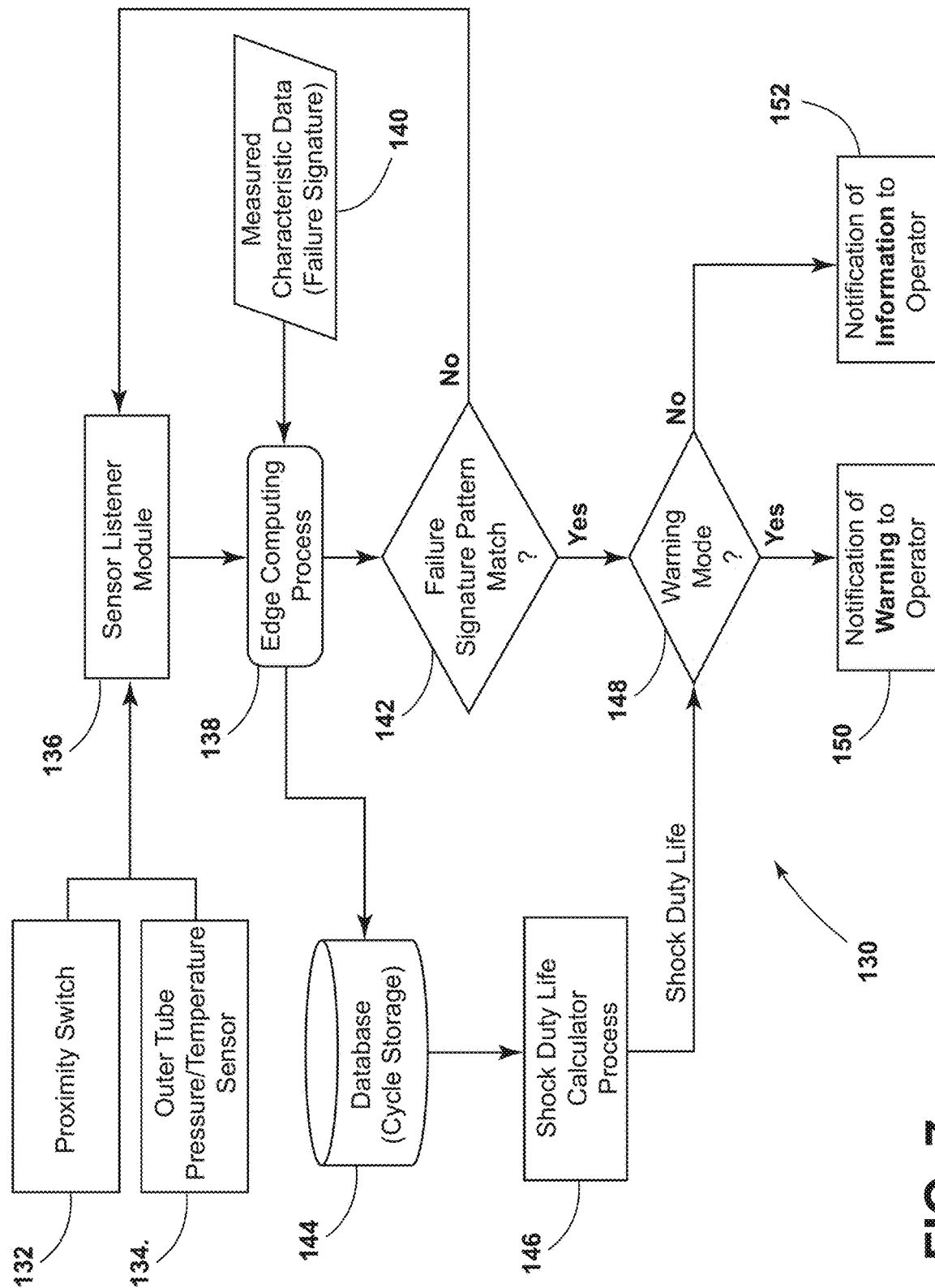
FIG. 7 is a flow chart showing shock absorber failure detection and/or prediction according to another aspect of the present disclosure.

With further reference to FIG. 7, a process 130 according to another aspect of the present invention utilizes data 132 from a proximity sensor (e.g. switch) 46 and pressure and/or temperature data 134 from sensor 46. It will be understood that the sensors may comprise wireless sensors, or the sensors may be connected to computing device 14 and/or other devices utilizing conductive lines. At step 136, the data 132 and/or data 134 is processed, and then transferred to edge computing service listener at step 138. Steps 136 and 138 may be performed by wireless device 19 and/or computing device 14 (FIG. 4). Measured data 140 is also supplied to edge computing service listener 138, and data is transferred to database 144. The database 144 may comprise one or more computing devices 14.

The measured data 132 and 134 is transferred to step 142, and the system (e.g. one or more processors) determines if the data satisfies predefined failure criteria. If not, the process loops back to step 136. However, if the system determines that the measured data meets predefined failure criteria (i.e. the data satisfies a pattern match), the system proceeds to step 148. At step 148, the system utilizes shock duty life calculation data from step 146, and determines if a warning mode is to be implemented. If a warning mode is to be implemented, the system proceeds as shown at step 150, and the system provides a warning to the operator. If the system determines that a warning mode is not required at step 148 (i.e. warning criteria has not been satisfied), the system proceeds to step 152, and notification information is provided to an operator. In general, the warning and/or information of steps 150 and 152 may be provided by a display screen 15, audio device, or a warning can be transmitted remotely to other devices 22. The remote devices 22 may comprise smartphones, laptop computers, and/or centralized computing devices and systems at a central monitoring facility.

FIGS. 7A-7D are graphs showing various ways to determine time-through-stroke of a shock 10 using sensor data. It will be understood that the approaches of FIGS. 7A-7D could be combined in any combination. For example, the time-through-stroke could be determined utilizing a plurality of approaches (e.g. 2 or more of the approaches of FIGS. 7A-7D), and an average time-through-stroke could be determined and utilized to determine and/or predict shock absorber failure. It will be understood that FIGS. 7A-7D are schematic in nature, and the actual signals from the switches and sensors may vary according to a particular application.

Figure 7A:
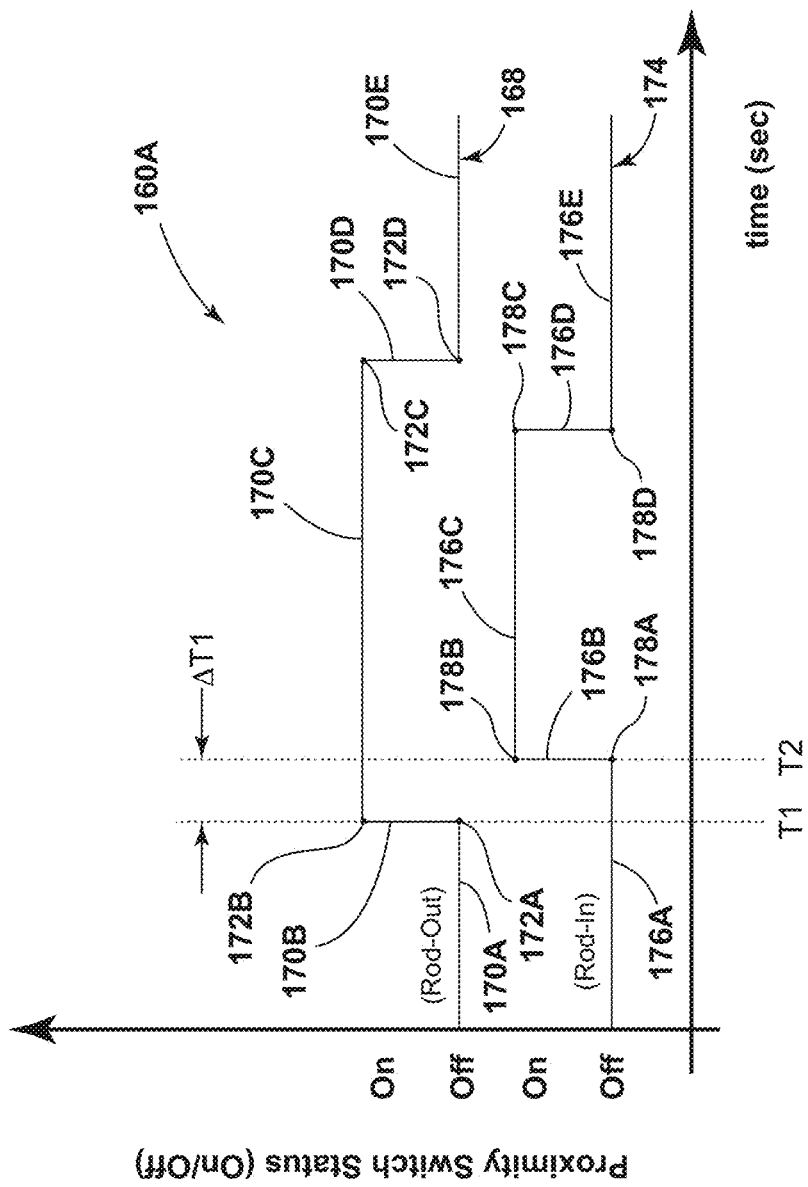
FIGS. 7A-7D are schematic graphs showing time-through-stroke determinations.
Figure 7B:
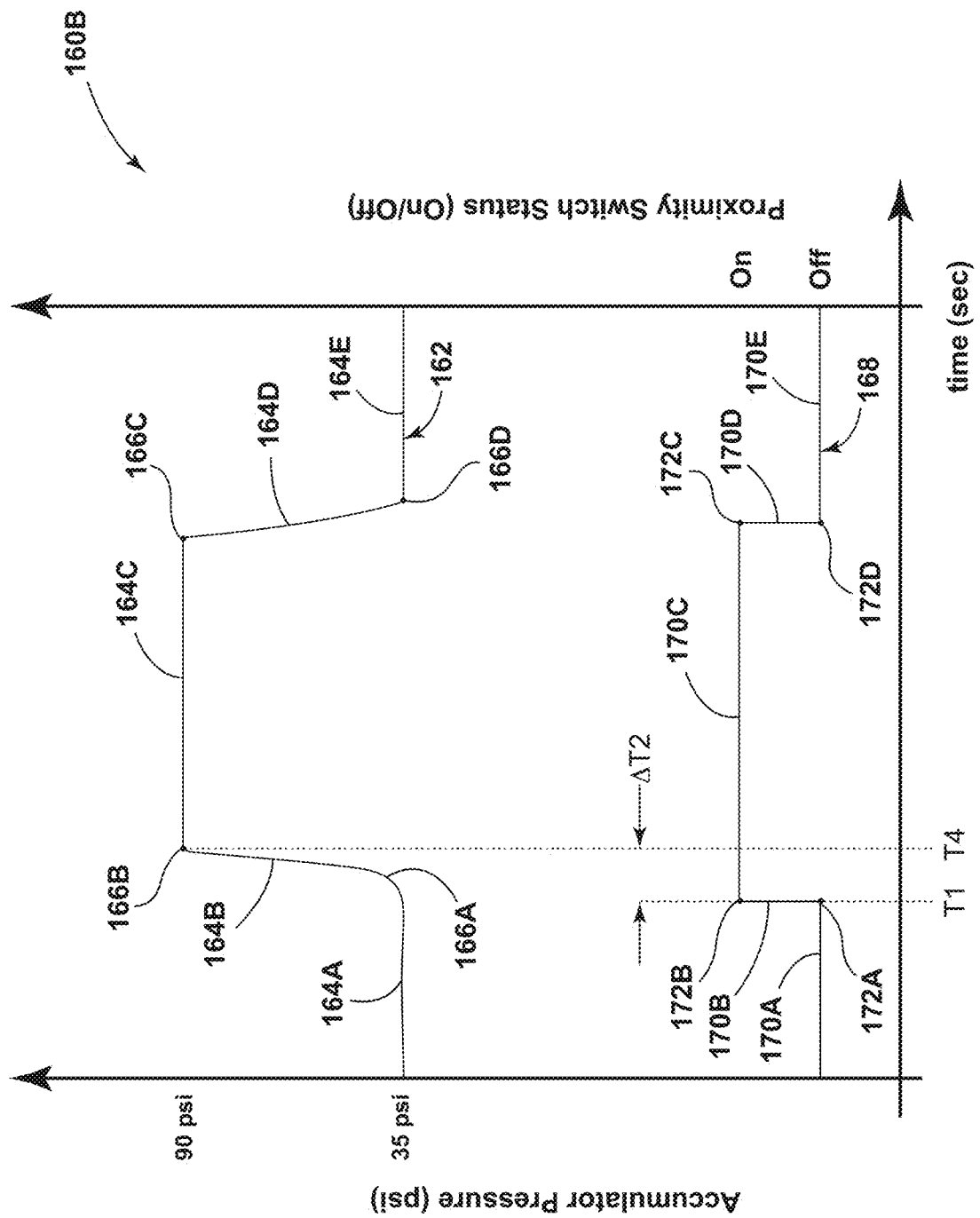
Figure 7C:
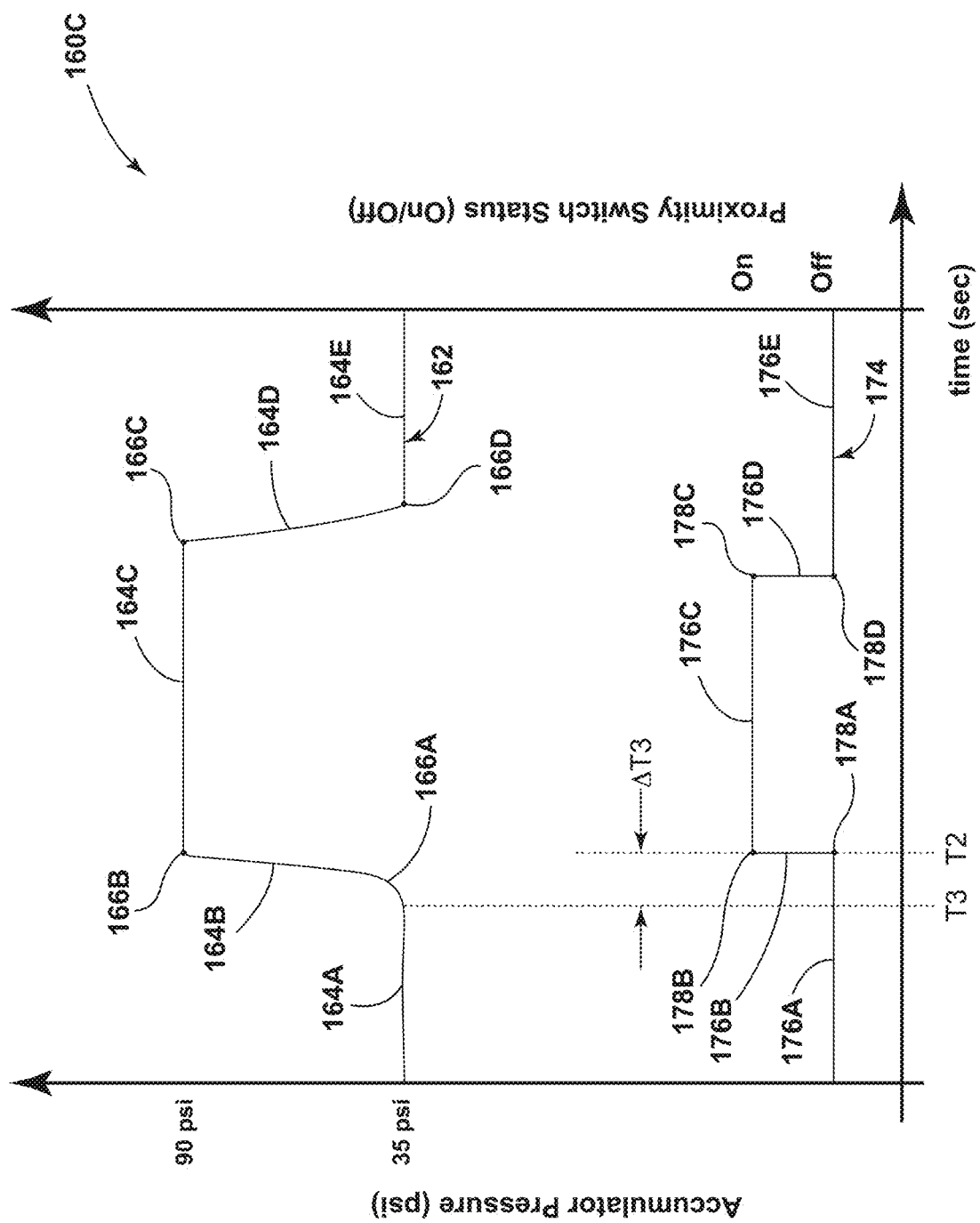
Figure 7D:
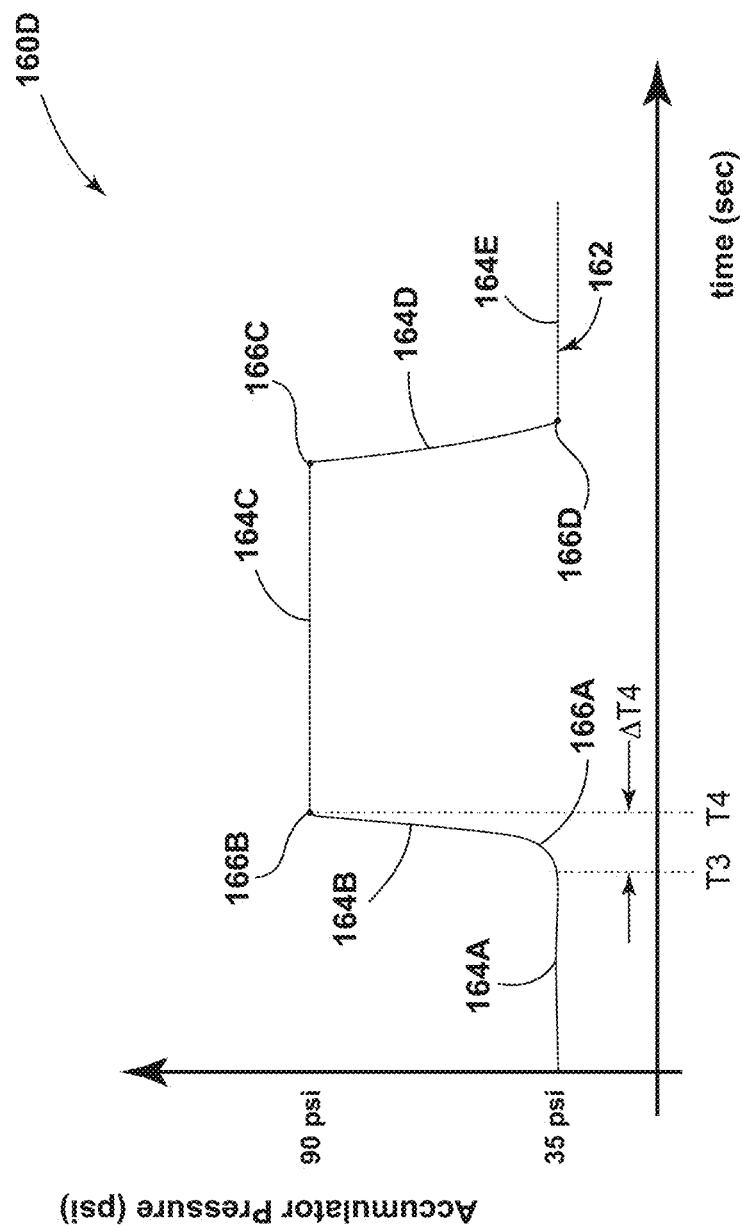

In FIGS. 7A-7D, the vertical line "T1" represents the time at which a signal 168 from a Rod OUT switch transitions from "Off" to "On." The line "T2" represents the time at which a Rod IN signal 174 transitions from an Off state to an On state. As shown in FIG. 7D, the time "T3" represents the time at which a pressure signal 162 begins to increase during a cycle, and the time "T4" represents the time at which the pressure signal transitions to a horizontal or constant value.

With reference to FIG. 7A, sensor data 160A comprises sensor readings from a Rod OUT proximity switch (line 168), and the Rod IN proximity switch (line 174). Lines 168 and 174 of FIG. 7A represent the "On" and "Off" states of the Rod OUT and Rod IN proximity switches, respectively. Line 168 includes horizontal "Off" segments 170A and 170E, and a horizontal "On" segment 170C. The vertical line segments 170B and 170D represent the transitions from the Off state to the On state and vice versa. Points 172A-172D represent the transitions between these line segments. Similarly, the line 174 includes horizontal "Off" portions 176A and 176E, and a horizontal "On" segment 176C, and vertical transition line segments 176B and 176D. The points 178A-178D represent the transitions between the horizontal and vertical line segments. $\Delta T1$ is the time-through-stroke calculated by taking the difference between the times of vertical lines T1 and T2.

With reference to FIG. 7B, sensor data 160B includes a pressure signal line 162 from the accumulator, which generally includes a first horizontal line segment 164A (baseline pressure) that transitions to a sloped line segment 164B at a radiused corner 166A as the pressure initially increases during a cycle. The pressure then levels off as shown by horizontal line segment 164C extending between points 166B and 166C. The pressure then drops as shown by the line segment 164D extending between points 166C and 166D, and transfers to a horizontal (baseline) pressure as shown by horizontal line segment 164E. It will be understood that the line 162 is representative, and the actual line segments 164A-164E may not be completely linear, and the transitions 166A-166D may comprise points, curves, etc. The time-through-stroke ΔT2 of FIG. 7B may be calculated by taking the distance between vertical lines T1 and T4.

Measurement criteria may be utilized to generate a plurality of pressure measurements (i.e. line 162) and proximity switch measurements (i.e. line 168) over a period of time while the shock is in use to thereby permit changes in the ΔT2 operating parameter over time to be determined. The changes in ΔT2 over time can be utilized to predict the end-of-life of a shock 10 and/or to detect deterioration in the performance of a shock 10 that may be indicative of where or problems that may indicate that a shock 10 is approaching end-of-life, even if the changes in the ΔT2 operating parameter do not constitute an actual failure or end-of-life of the shock.

With reference to FIG. 7C, time-through-stroke ΔT3 operating parameter for sensor data 160C may be calculated by determining a distance between times T3 and T2. As noted above, time T3 represents the time at which the pressure signal 162 begins to increase, and the time T2 represents the transition of the Rod IN signal 174 from the Off state to the On state.

With reference to FIG. 7D, time-through-stroke ΔT4 operating parameter for sensor data 160D may be calculated by taking the difference between the times T3 and T4. The times T3 and T4 represent the times at which the pressure signal 162 initially begins to increase (T3), and the time at which the pressure signal 162 transitions to a relatively constant value (T4).

The system may be configured to determine the time-through-stroke operating parameter utilizing one or more of the approaches shown in FIGS. 7A-7D, and the time-through-stroke data for a given shock may be stored. For example, the system may be configured to determine only a single time-through-stroke (i.e. one of ΔT1, ΔT2, ΔT3, or ΔT4). Alternatively, the system may be configured to utilize a combination of the time-through-stroke calculations. Also, time-through-stroke may be calculated utilizing only proximity sensor data (i.e. only line 168, only line 174, or lines 168 and 174).

Furthermore, other operating parameter criteria may be utilized to determine if a shock is degrading and/or to predict the end-of-life of a shock 10. For example, with reference to FIG. 7D, the pressure (line 162) may initially vary between 35 psi (baseline pressure) and 90 psi (peak pressure) for a given shock 10. However, over time, one or both of these pressures may decline, and this decline could be utilized to predict shock wear and/or end-of-life of a shock 10. For example, a failure of a shock 10 may be defined as a peak pressure that is less than 60 psi, and the system may be configured to generate a failure signal if the peak pressure drops below 60 psi. Also, if the peak pressure over time declines from 90 psi to, for example 70 psi, this decline can be extrapolated to predict a time or number of cycles at which the pressure will be predicted to drop below 60 psi. This end-of-life prediction can be continuously updated and conveyed to users at ground station 16 and/or a remote facility or device 22 (FIGS. 1 and 2). This information may be provided on display screen 15 or 15A (FIGS. 4 and 4A) or other suitable device. It will be understood that the information may also be provided in an audio form in connection with a visual display or solely as an audio signal.

Time-through-stroke changes over time can also be utilized to predict end-of-life of a shock 10 and/or to detect failure. In general, the time-through-stroke for a shock 10 will be approximately the same each time a shock 10 is exposed to the same load. In some applications (e.g. production machinery), a shock 10 may be exposed to a force of a specific magnitude in a repetitive manner (i.e. the magnitude of the load is the same for each cycle). If a shock 10 begins to wear and/or experiences a failure, the time-through-stroke for the shock 10 may decrease even if the loads applied to the shock 10 over time are substantially the same. Thus, the time-through-stroke operating parameter for a shock 10 over time may be utilized to predict end-of-life and/or to detect failure. For example, if empirical data shows that a given shock 10 has a high probability of failure once the time-through-stroke operating parameter drops to a predefined critical time, this predefined time-through-stroke time may be utilized to predict end-of-life (e.g. the time-through-stroke data over time can be used to extrapolate to a number of cycles at which the shock 10 will reach the critical time-through-stroke time).

Empirical data concerning shock failure and corresponding operating data (parameters) may be utilized to predict shock end-of-life. The empirical data may be utilized to determine correlations between the measured operating conditions/parameters (e.g. pressure, temperature, number of cycles, time-through-stroke, etc.), and the data can be utilized to extrapolate measured data (operating parameters) in shocks 10 that have not failed to predict the end-of-life of a given shock 10. For example, a plurality of end-of-life predictions may be determined for a given shock 10 utilizing different criteria (e.g. both pressure criteria and time-through-stroke criteria), and the criteria providing the shortest predicted shock life may be utilized to generate a warning if the end-of-life is predicted to be approaching. It will be understood that the various end-of-life predictions may be continuously recalculated and conveyed to operators at ground station 16 and/or to a remote device or facility 22. Furthermore, the criteria utilized to predict end-of-life for a given shock 10 may be modified over time if additional data is developed showing that variations in the end-of-life prediction provided more accurate ways to predict the end-of-life of a shock 10.

The system and method of the present disclosure may be utilized to predict normal shock absorber end-of-life to offer optical preventive maintenance in manufacturing environments to maximize up-time and minimize cost. It may also be configured to predict earlier than normal failures and allow for preemptive measures to avoid damage. The system may be configured to detect failures that occur and to communicate the failures immediately so that failures can be addressed quickly to prevent further damage and to include safety. In this way, the system may provide significant cost savings.

The system may include a ground control unit that has pre-loaded characteristic curves for failure of signatures. Based on raw data from the sensors, the ground controlling unit may compare peak signals and pattern analysis of raw data with the built in characteristic curve to identify patterns and predict failure.

The invention claimed is:

1. A shock absorber system for industrial machines, the shock absorber system, comprising:
a shock absorber having a body and a force-receiving member movably connected to the body whereby movement of the force-receiving member relative to the body from a rest position to a retracted position causes movement of a working fluid whereby the working fluid resists movement of the force-receiving member, and wherein the shock absorber is designed and configured to absorb energy when a movable member that is initially spaced-apart from the force-receiving member to form a gap therebetween moves to close the gap and comes into contact with the force-receiving member to move the force-receiving member from the rest position to the retracted position;
a first sensor configured to generate sensor data corresponding to at least one of a pressure of the working fluid and a temperature of the working fluid;
at least one proximity sensor configured to sense a position of the force-receiving member relative to the body;
at least one computing device operably coupled to the first sensor and the at least one proximity sensor;
a notification device operably coupled to the at least one computing device; and wherein:
the computing device is configured to determine if sensor data from the first sensor and the proximity sensor satisfies predefined failure criteria and, when the sensor data satisfies the predefined failure pattern criteria, cause the notification device to indicate at least one of: 1) a failure of the shock absorber; 2) a malfunction of the shock absorber; and 3) a predicted failure of the shock absorber.

2. The shock absorber system of claim 1, wherein:
the computing device is configured to combine data from the first sensor and data from the proximity sensor to calculate time-through-stroke of the shock absorber, wherein the time-through-stroke comprises a time required for the force-receiving member to move from the rest position to the retracted position when a movable member comes into contact with the force-receiving member.

3. The shock absorber system of claim 2, wherein:
the force-receiving member is configured to move from a first position to a second position and back to the first position to define a cycle;
the computing device is configured to determine a number of cycles that have occurred during a predefined time interval utilizing data from at least one of the first sensor and the proximity sensor.

4. The shock absorber system of claim 3, wherein:
the computing device is configured to compare the number of cycles to an expected number of cycles for a lifespan of the shock absorber and generate a signal to the notification device if the measured number of cycles is sufficiently close to or exceeds the expected number of cycles for the lifespan of the shock absorber.

5. The shock absorber system of claim 3, wherein:
the first sensor comprises a pressure sensor;
the computing device is configured to identify pressure peaks in data from the pressure sensor and determine how many pressure cycles have occurred based on the number of pressure peaks.

6. The shock absorber system of claim 2, wherein:
the computing device is configured to utilize sensor data measured at different times and predefined criteria to determine if the shock absorber is malfunctioning and/or to determine a predicted lifespan of the shock absorber.

7. The shock absorber system of claim 2, wherein:
the shock absorber body comprises a cylinder and the force-receiving member comprises a piston rod that is movably connected to the cylinder, the shock absorber further including an external accumulator outside the cylinder, the external accumulator having a cavity that receives operating fluid from the cylinder when the piston rod moves;
and wherein the first sensor is configured to measure at least one of pressure and temperature of operating fluid inside the external accumulator.

8. The shock absorber system of claim 1, wherein:
the first sensor comprises a first sensing unit mounted to the shock absorber, and wherein the first sensing unit comprises a wireless transmitter configured to wirelessly transmit measured data to the computing device.

9. The shock absorber system of claim 1, wherein:
the first sensor has a unique identifier associated with the first sensor, and the computing device is configured to store data from the first sensor utilizing the unique identifier and a time stamp;
the computing device is configured to utilize stored sensor data to determine trends in the data over time;
the computing device is configured to cause the notification device to display information concerning at least one trend in the stored sensor data over time.

10. The shock absorber system of claim 9, wherein:
the notification device is configured to display information concerning one or more operating parameters selected from the group consisting of pressure, temperature, historical sensor data, and derived data.

11. The shock absorber system of claim 1, wherein:
the first sensor is configured to measure at least one of a position, a velocity, and an acceleration of the force-receiving member;
the predefined failure pattern criteria comprises a plurality of data values for at least one of position, velocity, and acceleration.

12. Stationary machinery including the shock absorber system of claim 1, wherein:
the stationary machinery includes at least one moving machine component that is initially spaced apart and disconnected from the force-receiving member in a first position to form a gap therebetween, moves into contact with the force-receiving member as the moving component moves from the first position to a second position, and wherein the moving machine component is decelerated by the shock absorber after the moving machine component moves into contact with the force-receiving member during operation of the machinery.

13. The shock absorber system of claim 1, including:
at least one additional sensor that is configured to generate additional measured data corresponding to at least one characteristic of the shock absorber, wherein the at least one characteristic is selected from the group consisting of vibration, acceleration, viscosity of the working fluid, noise, sound, and infrared light, and wherein:
the system is configured to determine at least one of failure, predicted end-of-life, and predicted maintenance utilizing the additional measured data.

14. An amusement park ride comprising:
a tower, a gondola movably supported by the tower, a powered lift configured to move the gondola upwardly to an upper position at which the gondola is released to cause free-fall of the gondola to a lower position, and a control unit configured to provide operator control of the amusement park ride;
a shock absorber having a body and a force-receiving member movably connected to the body whereby movement of the force-receiving member relative to the body causes movement of a working fluid whereby the working fluid resists movement of the force-receiving member;
a first sensor configured to generate sensor data corresponding to at least one of a pressure of the working fluid and a temperature of the working fluid;
at least one proximity sensor configured to sense a position of the force-receiving member relative to the body;
at least one computing device operably coupled to the first sensor and the at least one proximity sensor;
a notification device operably coupled to the at least one computing device; and wherein:
the computing device is configured to determine if sensor data from the first sensor and the proximity sensor satisfies predefined failure criteria and, when the sensor data satisfies the predefined failure pattern criteria, cause the notification device to indicate at least one of: 1) a failure of the shock absorber; 2) a malfunction of the shock absorber; and 3) a predicted failure of the shock absorber wherein the force-receiving member of the shock absorber moves relative to the body as the gondola reaches the lower position to absorb energy and decelerate the gondola;
and wherein the notification device is located at the control unit of the amusement park ride whereby the notification device is configured to provide information concerning the shock absorber to an operator located at the control unit.

15. A method of monitoring an industrial shock absorber that is mounted to an industrial machine having a base supported on a surface and a movable machine member that moves between engaged and disengaged positions relative to the shock absorber, wherein the shock absorber includes a body and a force-receiving member movably connected to the body, whereby movement of the force-receiving member relative to the body from a rod OUT position to a rod IN position causes movement of working fluid whereby the working fluid resists movement of the force-receiving member, the method comprising:
causing the movable machine member to move towards and away from the force-receiving member in a cyclical manner, whereby the movable machine member moves away from the force-receiving member to the disengaged position to form a gap between the movable machine member and the force-receiving member, and moves from the disengaged position towards the force-receiving member such that the movable machine member comes into contact with the force-receiving member when the movable machine member is in the engaged position to cause the force-receiving movable member to move from the rod OUT position to the rod IN position;
utilizing at least one sensor to generate operating parameter data by measuring at least one operating parameter of the industrial shock absorber;
evaluating the operating parameter data utilizing predefined criteria to determine if the operating parameter data indicates that the industrial shock absorber has experienced excessive wear, failed, or is predicted to fail;
generating an alert when the industrial shock absorber has experienced excessive wear, failed, or is predicted to fail within a predefined time and/or number of cycles according to the predefined criteria.

16. The method of claim 15, wherein:
the at least one sensor is configured to measure at least one of a pressure and a temperature of a working fluid of an industrial shock absorber.

17. The method of claim 16, including:
generating an alert if a pressure measured by the at least one sensor is below a predefined value.

18. The method of claim 17, including:
generating an alert comprising a warning if a pressure measured by the at least one sensor meets predefined warning criteria.

19. The method of claim 16, including:
communicating operating parameter data from a plurality of industrial shock absorbers at remote geographic locations to a monitoring facility;
utilizing the operating parameter data to simultaneously monitor the operating states of the plurality of industrial shock absorbers.

20. The method of claim 15, including:
storing operating parameter data generated by the at least one sensor over time;
evaluating the operating parameter data to determine if an operating state of the industrial shock absorber has deteriorated over time.

21. The method of claim 20, including:
evaluating the data to determine a predicted lifespan of the industrial shock absorber.

22. The method of claim 15, wherein:
the at least one sensor is configured to measure at least one of a pressure and a temperature of a working fluid of an external accumulator of an industrial shock absorber.

* * * * *

UNITED STATES PATENT AND TRADEMARK OFFICE
CERTIFICATE OF CORRECTION

PATENT NO. : 11,156,262 B2
APPLICATION NO. : 16/778028
DATED : October 26, 2021
INVENTOR(S) : Chandrashekar et al.

It is certified that error appears in the above-identified patent and that said Letters Patent is hereby corrected as shown below:

In the Specification

Column 2, Line 50:
"MATT" should be --MQTT--;

Column 3, Line 62:
"MATT" should be --MQTT--;

Column 9, Line 15:
"MATT" should be --MQTT--.

Signed and Sealed this
Fifteenth Day of November, 2022

Katherine Kelly Vidal
*Director of the United States Patent and Trademark Office*